United States Patent
Cortez et al.

(10) Patent No.: US 7,630,377 B1
(45) Date of Patent: Dec. 8, 2009

(54) METHOD FOR PROVISIONING CIRCUITS ON MULTIPLE PARALLEL LINKS WITH A SINGLE SETUP MESSAGE

(75) Inventors: Bruce Gilbert Cortez, Freehold, NJ (US); Sanja Durinovic-Johri, Aberdeen, NJ (US); Pravin K. Johri, Aberdeen, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 509 days.

(21) Appl. No.: 11/513,460

(22) Filed: Aug. 31, 2006

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. .................. 370/395; 370/216; 370/238; 370/356; 709/241

(58) Field of Classification Search ......... 370/216–234, 370/238–254, 389–395; 709/223–228, 234–241
See application file for complete search history.

(56) References Cited

U.S. PATENT DOCUMENTS

| | | | |
|---|---|---|---|
| 6,269,084 B1 * | 7/2001 | Takei ..................... 370/248 |
| 6,366,580 B1 * | 4/2002 | Bradley et al. ........... 370/395.2 |
| 6,463,062 B1 | 10/2002 | Buyukkoc et al. |
| 6,724,881 B1 * | 4/2004 | McAllister et al. ...... 379/220.01 |
| 7,002,963 B1 | 2/2006 | Buyukkoc et al. |
| 7,283,467 B2 * | 10/2007 | Rajsic et al. .............. 370/228 |
| 7,295,510 B2 * | 11/2007 | Johri ........................ 370/216 |
| 7,391,732 B1 * | 6/2008 | Cortez et al. ............. 370/238 |
| 7,451,340 B2 * | 11/2008 | Doshi et al. .................. 714/4 |
| 2002/0021466 A1 * | 2/2002 | Abrams ..................... 359/128 |
| 2004/0114512 A1 | 6/2004 | Johri |
| 2004/0143653 A1 | 7/2004 | Taylor et al. |
| 2004/0190445 A1 | 9/2004 | Dziong et al. |
| 2004/0205237 A1 * | 10/2004 | Doshi et al. ................ 709/241 |
| 2004/0205238 A1 | 10/2004 | Doshi et al. |
| 2004/0205239 A1 | 10/2004 | Doshi et al. |
| 2005/0220006 A1 * | 10/2005 | Kumano et al. ............ 370/216 |
| 2006/0104297 A1 | 5/2006 | Buyukkoc et al. |
| 2006/0159076 A1 * | 7/2006 | Bless et al. ................ 370/356 |

* cited by examiner

*Primary Examiner*—Man Phan

(57) ABSTRACT

A method and system for provisioning circuits on multiple parallel links with a single setup message is disclosed. A setup message specifying links in a circuit path is transmitted to switches along the circuit path. If a switch determines that a link specified in the setup message has insufficient bandwidth for the circuit, the switch substitutes a parallel link having sufficient bandwidth for the specified link in the circuit path. The setup message can indicate whether substitution for a link is permitted. This can be used to prevent substitution for links when provisioning service routes for new circuits in order to maintain diversity requirements, while allowing substitution for links when provisioning restoration routes for failed circuits in order to reduce restoration time.

19 Claims, 4 Drawing Sheets

METHOD FOR PROVISIONING CIRCUITS ON MULTIPLE PARALLEL LINKS WITH A SINGLE SETUP MESSAGE

BACKGROUND OF THE INVENTION

The present invention is generally directed to provisioning circuits in circuit-based communication networks. More specifically, the present invention is directed to provisioning circuits on Multiple Parallel Links between switches in a circuit-based communications network with a single setup message.

Circuit-based communications networks consist of a number of switches (or routers) connected by communication lines. Examples of circuit-based communication networks include optical/electrical switch or optical cross connect networks, ATM networks, frame relay networks, networks of MPLS enabled label switched routers, and networks of Lambda (optical wavelength) routers. In a circuit-based communication network, there can be multiple lines connected between a given pair of switches. These lines can be of various sizes that are generally expressed in bandwidth units, such as OC-48, OC-192, etc. Lines are often grouped (aggregated) into links and certain information is associated with each link. One such piece of information is the administrative weight of the link, which is used in calculating paths for circuits. Another piece of information associated with each link is the physical route or diversity of the link. This information is used to calculate a path with a desired physical route or diversity in mind. For example, it may be desirable that two circuits have physically diverse routes so that a single network failure cannot take down both circuits. Other information associated with each link includes the total bandwidth of the link as well as the available bandwidth on the link. This information is used to find a path for a new circuit that has sufficient bandwidth to accommodate the circuit.

Communication lines connecting switches are grouped into links so that all of the information is not needlessly associated with each line, as many lines have the same physical route and administrative weights. The spare bandwidth on a link is the sum of the spare bandwidths on the lines of the link. When lines have different physical routes and/or administrative weights, it is necessary to group them into multiple parallel links in order to preserve the diversity information. If the lines having different physical routes and/or administrative weights were grouped into one link, the diversity information of the link would be compromised and it would be impossible to satisfy desired diversity requirements of circuits. Many customers demand diverse service routes for many of their circuits. In order to satisfy these diversity requirements, network providers may have many parallel links between pairs of switches.

A circuit-based communication network can be used to connect two end systems by establishing a circuit between the end systems. A circuit between end systems is established by routing between the switches connected to the end systems and can span multiple links. The sequence of links spanned by the circuit is called its (service) route. If there is a failure in the network affecting one or more of the links or switches in the service route of a circuit, then the circuit fails. In this case, the circuit is re-routed on a new (restoration) route that avoids the failed portions of the network. When the failure is repaired, the circuit can revert back to its original service route.

Switches in circuit-based communication networks communicate with each other using routing and signaling protocols in order to automate a variety of functions, such as self-discovery of network resources, construction and maintenance of a link-state database of routing information across all switches, automatic provisioning and restoration of circuits, detection of network failure conditions, and flooding of information related to any change in the state of the network to all switches including failures of switches and links changes in available bandwidth on links, etc. Examples of such routing and signaling protocols include Open Shortest Path First (OSPF), Multi-Protocol label Switching (MPLS), Private Network to Network Interface (PNNI), etc., and variants of these standard protocols that have been adapted to specific networks or applications. Networks using these protocols are characterized by the fact that the intelligence is distributed in every switch and is not centralized. Typically, all switches run the same set of protocols although the functions performed by the switches may vary based on how switches are used. Thus, the switches, while employing the same or similar protocols, operate independently of each other. Any coordination of activities between switches is done by sending messages to each other using the routing and signaling protocols.

In order to provision a new circuit, one switch in the network is selected as a source switch and another switch is selected as a destination switch. The source switch calculates a path for the circuit using information collected by the routing protocol. This information typically includes network topology, available network resources, etc. The path must have sufficient network resources to meet quality of service requirements (bandwidth, delay, etc.) of the circuit. The circuit route is specified as a sequence of links connecting various switches between the source switch and the destination switch. Typically, the path is generated using a variant of Dijkstra's shortest path algorithm, which determines a path with a minimum weight based on weights of the links connecting switches between the source and destination switches.

Once the source switch calculates the path of the circuit, the source switch sets up the circuit using the signaling protocol. The source switch sends a setup message along the selected path of the circuit. Each switch in the path determines whether the requested resources are available and then allocates the resources to the circuit. The setup message contains the selected path, and each switch forwards the setup message to the next switch in the path. If all switches are able to allocate the resources, the setup is successful and the circuit is established. If any switch determines that the requested resources are not available, or cannot allocate the resources for any reason, the setup fails. An unsuccessful setup results in a crankback to the source. A crankback is a message that returns to the source along the same path that the setup message was transmitted and de-allocates the resources previously allocated by the setup message. The crankback message may contain information regarding where the setup failed. The source then calculates a new path for the circuit and sends out a new setup message to setup the new path. The new path must also have sufficient resources to meet the quality of service requirements of the circuit.

When a failure occurs in a circuit-based communication network, such as a fiber cut or switch failure, a number of circuits can fail as a result. The switches adjacent to the location of the failure detect the failure condition, identify the circuits affected by the failure, and generate release messages using the signaling protocol. For each circuit, release messages travel in opposite directions away from the failure to the source and the destination switches of the circuit, releasing all resources allocated to the circuit along the way. The source switch then attempts to restore the circuit by determining a new path and establishing the failed circuit on the new path.

The new path must have sufficient network resources to meet the needs of the circuit. The new path must also avoid the failed part of the network. Information about the failed part of the network is disseminated by the routing protocol, but there may be a delay in distributing this information. The release message may also contain information regarding where the circuit failed. In some networks, switches pre-calculate a restoration path for each circuit. This path is attempted first whenever the circuit fails. If the setup attempt on the pre-calculated restoration path fails, then the Dijkstra algorithm is run to obtain a new path.

Unsuccessful restoration attempts result in crankbacks, and in many cases a circuit may crankback multiple times before it is restored. Each crankback increases the amount of time the service associated with the circuit suffers an outage, so it is desirable that the number of crankbacks be minimized. The failed circuits all compete for the same available resources during restoration. In many cases, there are insufficient network resources to restore all of the failed circuits, and some of the circuits cannot be restored until the network failure is fixed.

As described above, switches in a circuit-based communication network communicate using routing and signaling protocol. Whenever the available bandwidth on a link changes, the switches adjacent to that link send out a routing message using the routing protocol to advertise the available bandwidth on the link. This notifies the other switches in the network of the change in available bandwidth on the link. However, in order to keep the number of routing messages in the network in check, a timer is typically used to throttle the number of routing messages. For example, routing messages for a particular link in a network may be sent at a rate no higher than 1 per second.

When a failure occurs, there is a flurry of activity to identify and release the affected circuits and release messages are transmitted using the signaling protocol. These release messages change the available bandwidth of the links the affected circuits traversed. Routing messages are transmitted using the routing protocol to advertise the new available bandwidths. The routing messages are then throttled until the timer controlling them expires. The release messages initiate another more activity as switches attempt to restore the failed circuits for which they are the source. As circuits restore, the available bandwidth on links in the circuit paths changes repeatedly, but these advertising of these changes using the routing protocol is delayed due to the throttling of the routing message. Accordingly, source switches calculate paths for circuits using bandwidth information that may have changed. The setup messages along such paths typically do not succeed resulting in crankbacks and new path calculations. This significantly increases the amount of time required to restore circuits during a network failure.

BRIEF SUMMARY OF THE INVENTION

The present invention provides a method and system capable of reducing restoration time of circuits. This is accomplished by switches substituting a parallel link for a specified link in a circuit path when the specified link does not have sufficient network resources to allocate for the circuit instead of a crankback to the source switch. The present invention also provides a method and system capable of reducing the time required for establishing restoration paths for failed circuits, while preserving diversity between parallel links during provisioning service paths of circuits. This is accomplished by allowing switches to substitute a parallel link for a specified link in a circuit path during restoration of a failed circuit, but not substitute for the specified links in a circuit path during provisioning of a service route for a new circuit.

In one embodiment of the present invention, a source switch in a network calculates a network path and generates a setup message. The setup message specifies the path for a circuit as a sequence of links in the path. The setup message is transmitted along the path to the switches in the path. Each switch checks the bandwidth available on the specified links associated with that switch. If insufficient bandwidth for the circuit exists on a specified link, the switch substitutes a parallel link having sufficient bandwidth for the specified link. The switch then updates the setup message to replace the originally specified link with the parallel link in the sequence of links and transmits the updated setup message along the path specified in the updated setup message. Accordingly, in the case of insufficient bandwidth available on a specified link, no crankback is required unless there is no parallel link with sufficient bandwidth available.

The setup message can indicate whether substitution of parallel links is permitted for the specified links in the circuit path. This can be implemented by associating a flag with each of the specified links to indicate whether substitution is permitted for that link. This can also be implemented using a single flag to indicate whether substitution is permitted for all of the specified links. This can also be implemented by using a wildcard character to indicate links for which substitution is permitted. According to an embodiment of the present invention, the setup message for provisioning a service path for a new circuit can indicate that substitution of parallel links is not permitted for any specified links in the path, and the setup message for provisioning a restoration route for a failed circuit can indicate that substitution of parallel links is permitted for any of the specified links in the path These and other advantages of the invention will be apparent to those of ordinary skill in the art by reference to the following detailed description and the accompanying drawings.

DETAILED DESCRIPTION

Figure 1:
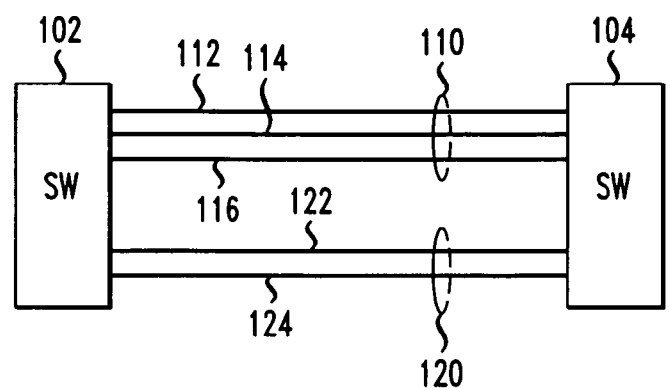
FIG. 1 illustrates exemplary switches connected by parallel links.

FIG. 1 illustrates two switches 102 and 104 connected by parallel links 110 and 120. As illustrated in FIG. 1, each link 110 and 120 is made up of multiple communication lines 112, 114, 116, 122, and 124. Communication lines 112, 114, and 116 are grouped together to form link 110, and communication lines 122 and 124 are grouped together to form link 120. The communication lines 112, 114, 116, 122, and 124 can have various sizes which can be expressed in bandwidth units, such as Optical Carrier (OC)-48, OC-192, etc. The bandwidth of each link 110 and 120 is the total bandwidth of the communication lines 112, 114, 116, 122, and 124 that make up the link. For example, if communication lines 112, 114, 122, and 124 are OC-48 lines and communication line 116 is an OC-192 line, link 110 has a total bandwidth of OC-288, and link 120 has a total bandwidth of OC-96.

Figure 2:
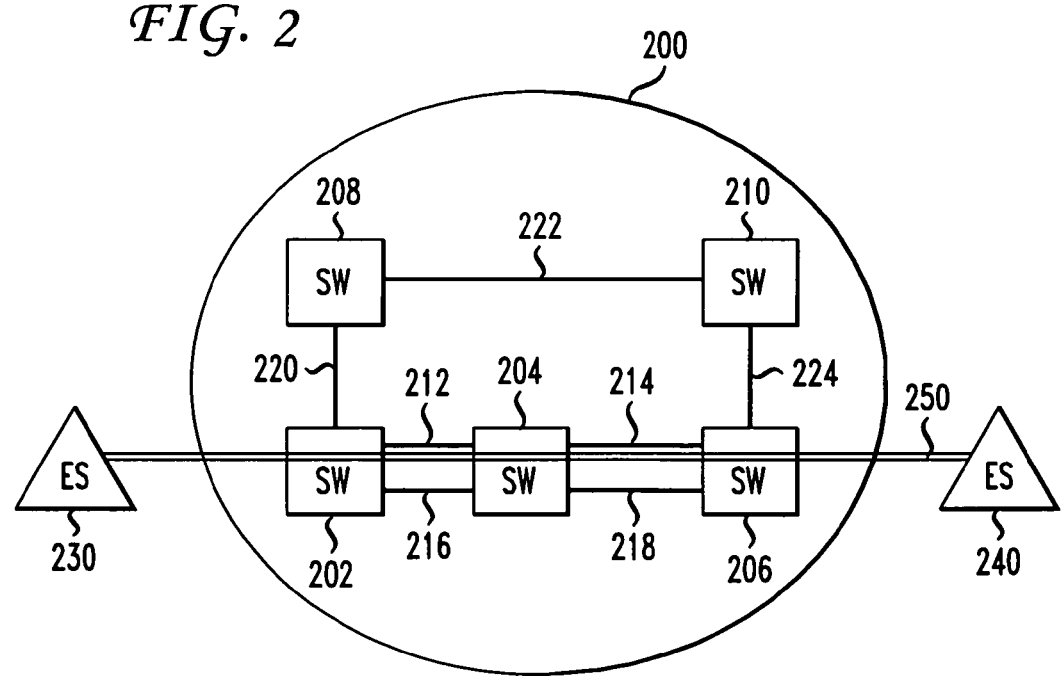
FIG. 2 illustrates an exemplary circuit-based communication network.

FIG. 2 illustrates an exemplary circuit-based communication network 200. As illustrated in FIG. 2, the network 200 includes switches 202, 204, 206, 208, and 210 which are connected with links 212, 214, 216, 218, 220, 222, and 224. As used herein, the term "switch" refers to any node in a circuit-based communication network. Links 212 and 216 are parallel links connecting switches 202 and 204, and links 214 and 218 are parallel links connecting switches 204 and 206. Each of the switches is controlled by a Control Module (CM) running a Connection Admission Control (CAC) program which controls the assignment of switch resources to circuits. The CMs use a routing protocol and a signaling protocol to communicate with CMs in other switches.

As illustrated in FIG. 2, end systems 230 and 240 are connected to the network 200. End system 230 connects to switch 202 and end system 204 connects to switch 206. A circuit 250 between the end systems 230 and 240 can be established by routing between the two switches 202 and 206 connected to the end systems 230 and 240, with switch 202 chosen as the source for the circuit in this case. Thus, switch 202 is considered the source switch 202 and switch 206 is considered the destination switch 206 for the circuit 250.

Figure 3:
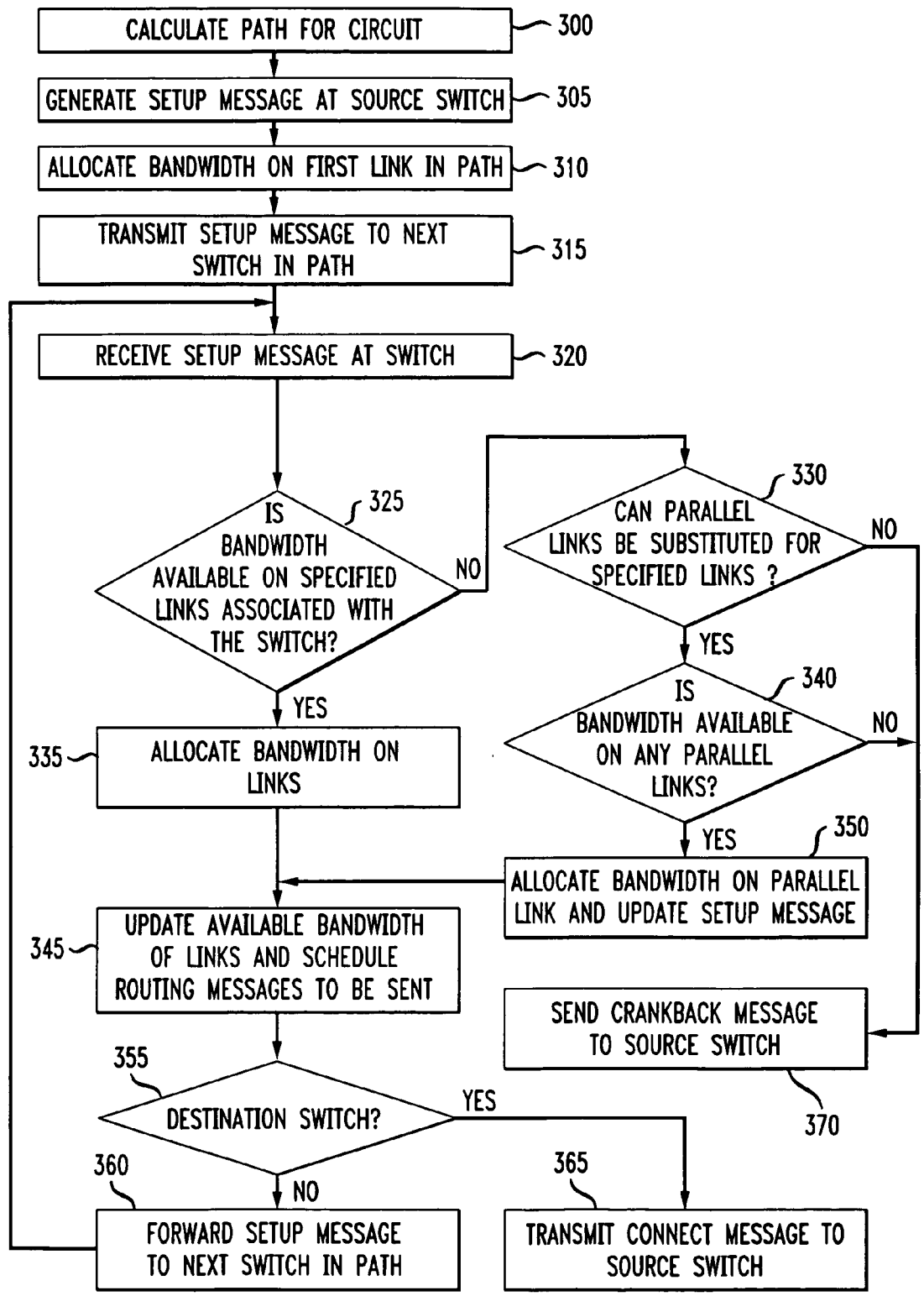
FIG. 3 illustrates a method of provisioning a circuit according to an embodiment of the present invention.

FIG. 3 illustrates a method of provisioning a circuit according to an embodiment of the present invention. This method will be described using the example of the circuit 250 between the end systems 230 and 240 of FIG. 2 while referring to FIGS. 2 and 3. It is to be understood that this method can apply to the provisioning of any circuits in any circuit-based networks. At step 300, the source switch calculates a path through the network to the destination switch. The source switch calculates the path based on routing information distributed throughout the network by the routing protocol. This routing information can be stored in a link state database at the source switch. An exemplary link state database containing routing information for the network 200 of FIG. 2 is shown in Table 1 below.

TABLE 1

| Link | Admin. Wt. | Total BW | Spare BW | Fiber Span ID |
|------|------------|----------|----------|---------------|
| 212  | 100        | 96       | 12       | A, B          |
| 214  | 200        | 192      | 48       | C             |
| 216  | 100        | 144      | 31       | A, D          |
| 218  | 200        | 96       | 5        | E             |
| 220  | 50         | 96       | 64       | F             |
| 222  | 250        | 144      | 32       | G, H, I       |
| 224  | 50         | 48       | 8        | J             |

As shown in Table 1, the link state database can include information regarding an administrative weight, total bandwidth, available bandwidth, and fiber spans of each link 212, 214, 216, 218, 220, 222, and 224 of the network 200. The administrative weight is used in the path calculation to calculate the shortest path from the source switch 202 to the destination switch 206. The amounts of bandwidth are used to ensure that the calculated path can meet quality of service requirements of the circuit 250. The fiber span IDs associated with each link identify the communication lines that make up each link, and are used to ensure that the calculated path meets diversity requirements of the circuit 205. Links 212 and 216 are parallel links between switches 202 and 204 and links 214 and 218 are parallel links between switches 204 and 206. As shown in Table 1, links 212 and 216 share a common fiber span A. This means that part of the route of these two links 212 and 216 is over a common fiber span (A) and part of the route is on different fiber spans (B and D). Hence, these links 212 and 216 are not fully diverse. Links 214 and 218 do not share any fiber spans and are fully diverse.

In order to calculate the path of the circuit, the source switch uses Dijkstra's shortest path algorithm which finds the path with the shortest total minimum weight. When there are multiple paths with the same total administrative weight, Dijkstra's algorithm arbitrarily selects one of the paths. The possible paths between the source switch 202 and the destination switch 204 of FIG. 2 based on the routing information shown in the link state database table of Table 1 are shown in Table 2 below.

TABLE 2

| Path # | Links in Path    | Path Weight | Spare Path BW |
|--------|------------------|-------------|---------------|
| 1      | {212, 214}       | 300         | 12            |
| 2      | {212, 218}       | 300         | 5             |
| 3      | {216, 214}       | 300         | 31            |
| 4      | {216, 218}       | 300         | 5             |
| 5      | {220, 222, 224}  | 350         | 8             |

As shown in Table 2, there are five possible paths between the source switch 202 and the destination switch 206. The spare path bandwidth is the minimum of the spare bandwidths of the links in the path and indicates the maximum size of a new circuit that can be provisioned on the path. Accordingly, if a circuit requires more than the spare bandwidth available on a path, that path cannot be selected to be the path of the circuit. The path weight of each path is the sum of the administrative weights of all of the links in the path. Each of paths 1-4 have the same path weight, and can be selected by the source switch 202 as the path of the circuit 250, as long as there is enough spare bandwidth to meet the requirements of the circuit 250.

Returning to FIG. 3, at step 305, the source switch generates a setup message specifying the path for the circuit. The setup message specifies the path for the circuit as a sequence of link IDs corresponding to the links in the path. According to an embodiment of the present invention, the setup message can indicate whether the specified links in the path can be replaced by parallel links if there is insufficient bandwidth in the specified links.

Figure 4:
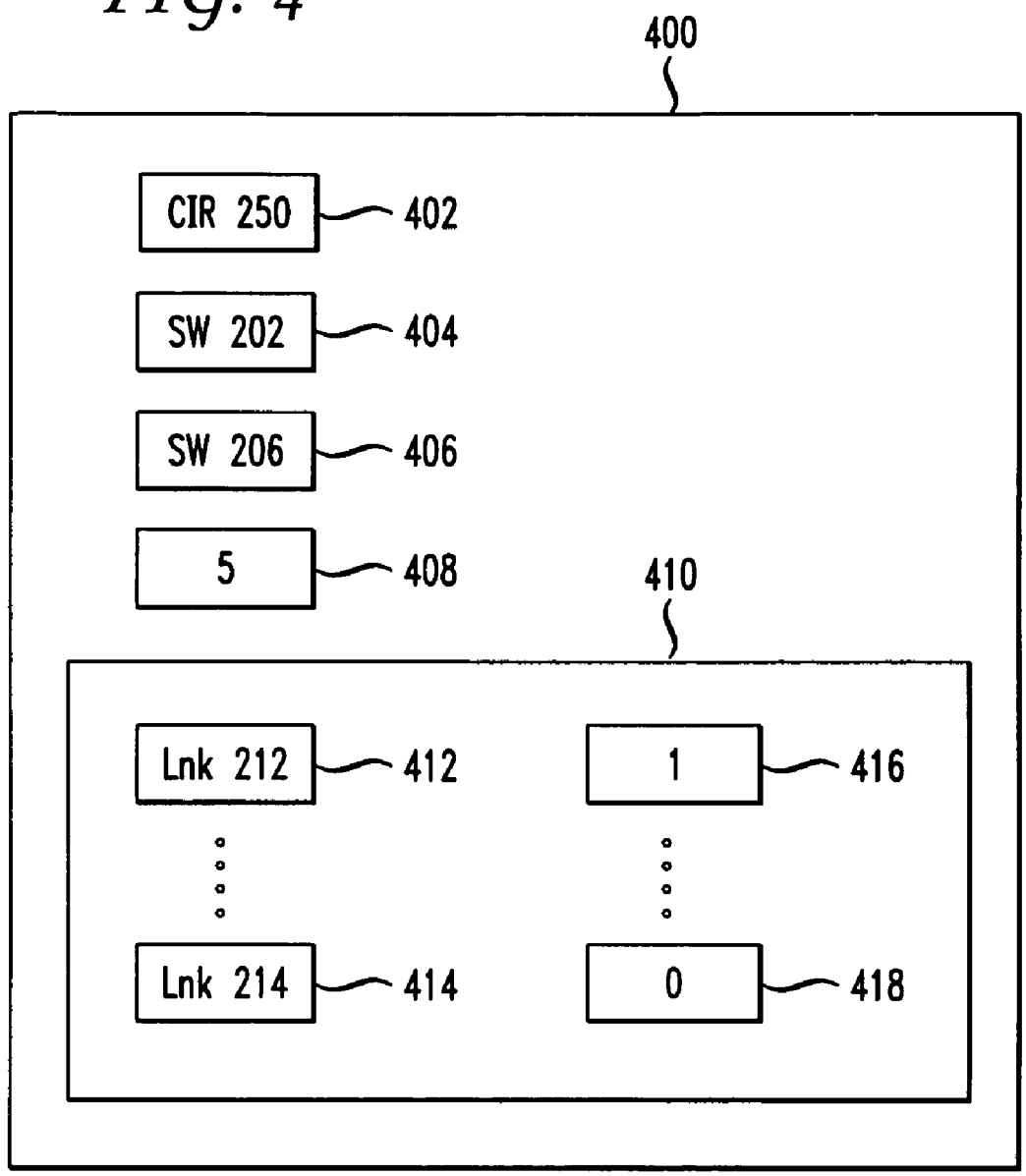
FIG. 4 illustrates an exemplary setup message according to an embodiment of the present invention.

FIG. 4 illustrates an exemplary setup message 400 according to an embodiment of the present invention. As illustrated in FIG. 4, the setup message 400 specifies a circuit ID 402, a source switch ID 404, a destination switch ID 406, a circuit bandwidth 408 indicating an amount of bandwidth required for the circuit, and the path 410 for the circuit. The path 410 of circuit is specified as a sequence of link IDs 412, . . . , 414 of the links in the path 410. A flag 416, . . . , 418 is associated with each link ID 412, . . . , 414 in the path 410. If the flag 416, . . . , 418 is set to 0, the associated link 412, . . . , 414 cannot be replaced by a parallel link. If the flag 416, . . . , 418 is set to 1, the associated link 412, . . . , 414 can be replaced in the path by a parallel link. As shown in FIG. 4, the setup message 400 specifies path 1 of Table 2 for the circuit 250 of FIG. 2. In this example, links 212 and 214 are the only links in the path. The flag 416 for link 212 is set to 1, so link 212 can be replaced by a parallel link if there is insufficient bandwidth on link 212. The flag 418 for link 214 is set to 0, so link 214 cannot be replaced by a parallel link even if there is insufficient bandwidth.

Figure 5:
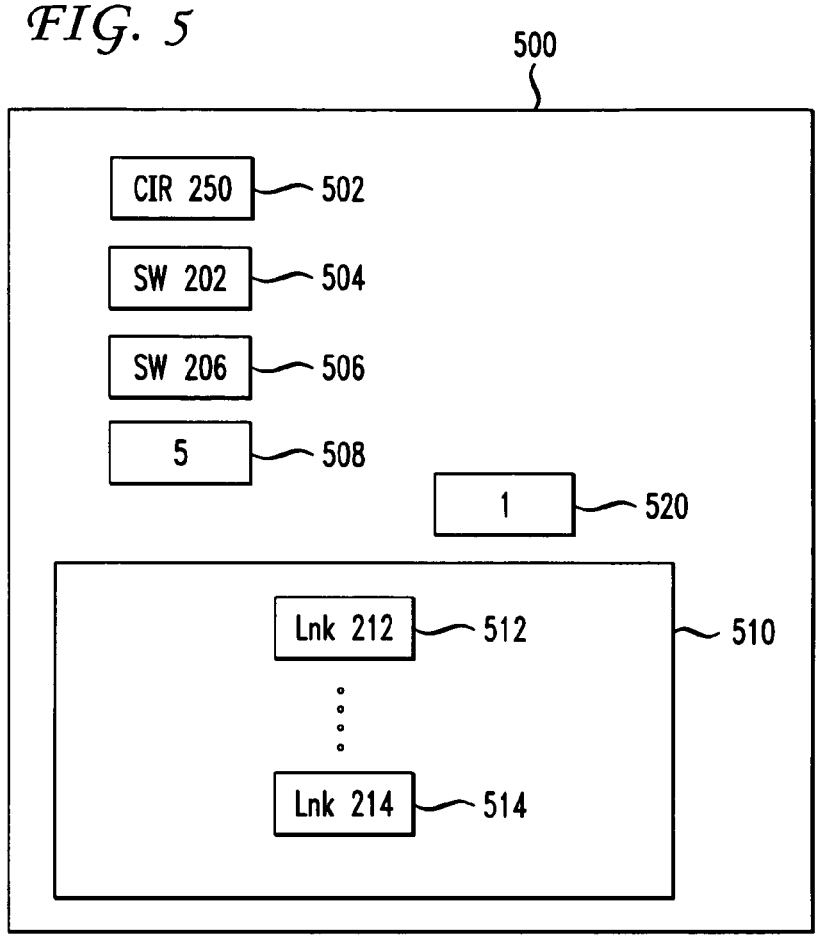
FIG. 5 illustrates an exemplary setup message according to another embodiment of the present invention.

FIG. 5 illustrates an exemplary setup message according to another embodiment of the present invention. As illustrated in FIG. 5, the setup message 500 specifies a circuit ID 502, a source switch ID 504, a destination switch ID 506, a circuit bandwidth 508 indicating an amount of bandwidth required for the circuit, and the path 510 for the circuit. The path 510 of circuit is specified as a sequence of link IDs 512, . . . , 514 of the links in the path 510. In this embodiment, the setup message contains a single flag 520 to indicate whether substitution is permitted for all of the links in the path 510. If the flag 520 is set to 0, substitution of parallel links is not permitted for any of the links in the path 510. If the flag is set to 1, parallel links can be substituted for any of the links in the path.

The present invention is not limited to the embodiments shown in FIGS. 4 and 5, and the setup message may include other information in place of or in addition to the information shown in those embodiments. According to another embodiment of the present invention, wildcard characters can be used to specify link IDs in the setup message. A wildcard character (such as * in UNIX) can be used to indicate that any parallel link can be used. For example, if a link specified as "Node_A—Port_A:Node_Z-Port_Z" indicates a link connecting port A of node A with port Z of node Z, then "Node_A-*:Node_Z:*" indicates that any of the parallel links between node A and node Z that has sufficient bandwidth can be used.

Returning to FIG. 3, at step 310, the source switch allocates bandwidth for the circuit on the first link in the path. For example, if the path of circuit 250 of FIG. 2 is links 212 and 214, the source switch 202 allocates the amount of bandwidth required for circuit 250 on link 212.

At step 315, the source switch transmits the setup message to the next switch in the path. The source switch transmits the setup message along the path of the circuit using the signaling protocol of the network. In the example of FIG. 2, if the path of circuit 250 is links 212 and 214, the source switch 202 transmits the setup message to switch 204 over link 212.

At step 320, the setup message is received at the next switch in the path of the circuit. The setup message specifies the links in the path of the network, and the switch determines which of the links are associated (i.e., connected to) that switch (in both directions). For example, switch 204 of FIG. 2 receives the setup message from the source switch 202, and links 212 and 214 are associated with switch 204.

At step 325, the switch determines whether sufficient bandwidth for the circuit is available on each of the links associated with the switch. For example, switch 204 of FIG. 2 determines whether sufficient bandwidth for circuit 250 is available on links 212 and 214. If sufficient bandwidth is available on a link, the method proceeds to step 335. In sufficient bandwidth is not available on a link, the method proceeds to step 330.

At step 335, when there is sufficient bandwidth available on a link specified in the setup message, the switch allocates bandwidth for the circuit on that link. For example, if switch 204 of FIG. 2 determines that there is sufficient bandwidth for circuit 250 available on link 212, which is specified in the setup message, switch 204 allocates the bandwidth for circuit 250 on link 212.

At step 330, when there is insufficient bandwidth available on a link specified in the setup message, the switch determines whether a parallel link is permitted to be substituted for the specified link. As described above, the setup message can include an indicator for indicating whether substitution of parallel links is permitted for the links specified in the path of a circuit. The switch determines whether parallel links can be substituted based on this indicator. For example, in the embodiment of FIG. 4, the setup message includes a flag associated with each link. In this embodiment, if the flag associated with the specified link is set to 0, the switch determines that a parallel link cannot be substituted for the specified link, and if the flag associated with the specified link is set to 1, the switch determines that a parallel link can be substituted for the specified link. In the embodiment of FIG. 5, the setup message includes a single flag for the path of the circuit. In this embodiment, if the flag is set to 0, a parallel link cannot be substituted for any of the links specified in the setup message, and if the flag is set to 1, a parallel link can be substituted for any of the specified links. According to another embodiment of the present invention, the switch can determine that substitution of a parallel link for the specified link is permitted if the link is specified using a wildcard character. If a parallel link is permitted to be substituted for the specified link, the method proceeds to step 340. If a parallel link cannot be substituted for the specified link, the method proceeds to step 370.

At step 340, the switch determines whether sufficient bandwidth is available for the circuit on any parallel links. For example, if there is insufficient bandwidth for circuit 250 of FIG. 2 available on link 214, and the setup message indicates that a parallel link can be substituted for link 214, switch 204 determines whether sufficient bandwidth is available on link 218. If there is sufficient bandwidth available on any of the parallel links, the method proceeds to step 350. If there is no parallel link with sufficient bandwidth available, the method proceeds to step 370.

At step 370, a crankback message is sent to the source switch. As described above, this step occurs if the setup message indicates that substitution of a parallel link for a specified link is not permitted (step 335) or if there is no parallel link with sufficient bandwidth for the circuit.

At step 350, the switch allocates bandwidth for the circuit on a parallel link and updates the setup message to replace the originally specified link with the parallel link in the setup message. For example, if switch 204 of FIG. 2 determines that sufficient bandwidth for circuit 250 is available on link 218 (when insufficient bandwidth is available on specified link 214), switch 204 allocated the bandwidth for circuit 250 on bandwidth 218.

At step 345, when the switch allocates the bandwidth for the circuit of links associated with the switch (either specified links (step 335) or parallel links (step 350)), the switch updates the available bandwidth of the links and schedules routing messages to be sent. The switch updates the available bandwidth of the links in the link state database stored on the switch, and the routing messages to advertise the change in the amount of available bandwidth on the link to the other switches in the network. The routing messages are distributed via the routing protocol of the network to the other switches in the network.

At step 355, if the switch is not the destination switch, the method proceeds to step 360, and if the switch is the destination switch, the method proceeds to step 365. At step 360, the switch forwards the setup message to the next switch in the path of the circuit. The setup message is forwarded using the signaling protocol. The next switch receives the setup message (step 320) and the process is repeated. For example, switch 204 of FIG. 2 is not the destination switch for circuit 250, so switch 204 forwards the setup message to switch 206.

At step 365, the destination switch transmits a connect message to the source switch using the signaling protocol. The connect message indicates that the circuit has been successfully set up and contains the path of the circuit including any parallel links that were used instead of the links in the path determined by the source switch. For example, switch 206 of FIG. 2 is the destination switch of circuit 250. Accordingly, destination switch 206 transmits a connect message to source switch 202 to indicate that the circuit between end systems 230 and 240 is successfully set up.

Diversity requirements are very important for service routes of circuits. However, when a circuit fails, diversity requirements may be considered less important than the restoration time of the circuit. According to various embodiments of the present invention, substitution of parallel links for specified links can be prohibited during provisioning of a new circuit, but permitted during restoration of a failed circuit. This ensures that diversity will not be sacrificed by substitution of parallel links during provisioning of a service path for a circuit, but allows substitution during restoration of a circuit in order to increase restoration speed by reducing crankbacks. For example, the setup message of FIG. 5 includes a single flag indicating whether substitution of parallel links is permitted for all of the links in the path. According to an embodiment of the present invention, the flag can be set to 0 when setting up a new circuit and set to 1 when restoring a failed circuit. Similarly, in the setup message of FIG. 4, the flags associated with all of the links in a circuit path can be set to 0 when setting up a new circuit and set to 1 when restoring a failed circuit. According to another embodiment of the present invention, the links specified in the path of the setup message can be specified using wildcard values when a restoration path for a failed circuit is being set up, and specific link IDs when setting up a new circuit.

These embodiments require a specific route when setting up service paths for circuits, but in the event of a network failure affecting a circuit, allow the circuit to be restored using any available route that can accommodate the circuit. According to an embodiment of the present invention, once the failure conditions are fixed in the network, restored circuits (using substituted parallel links) can revert to their original (service) paths from the restoration routes. In this embodiment, the switches maintain a record of the original route. When the network failure conditions clear, the circuit is released from the restoration route and set it up again on the original service route. Accordingly, any diversity requirements sacrificed in order to reduce restoration time are restored when the network failure clears.

Figure 6:
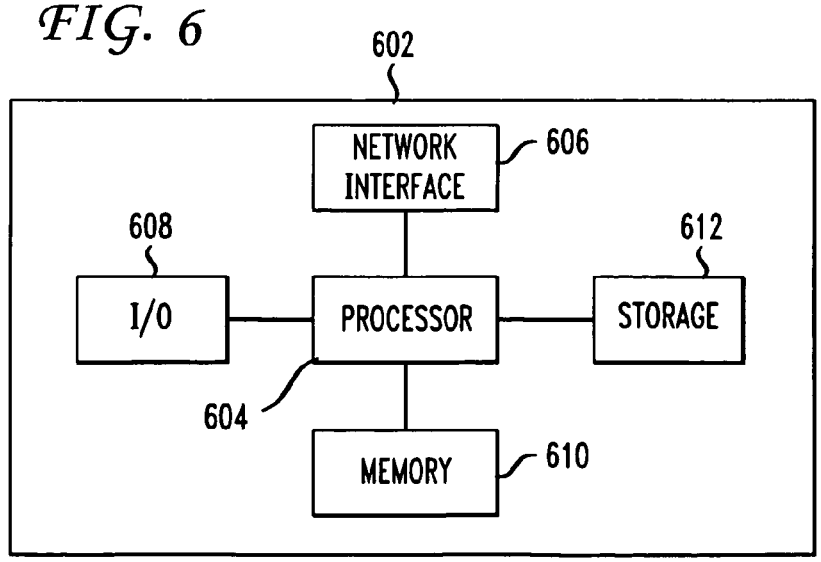
FIG. 6 illustrates a high level block diagram of a computer capable of implementing the present invention.

The switches can be implemented as computers using well known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the Connection Admission Control (CAC) can be implemented as applications defined by the computer program instructions stored in the memory 610 and/or storage 612 and controlled by the processor 604 executing the computer program instructions. The computer 602 also includes one or more network interfaces 606 for communicating with other devices via a network. The computer 602 also includes input/output 608 which represents devices which allow for user interaction with the computer 602 (e.g., display, keyboard, mouse, speakers, buttons, etc.) One skilled in the art will recognize that an implementation of an actual computer will contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving at a switch a setup message identifying a path of a circuit as a specified sequence of links;
determining whether sufficient bandwidth is available for the circuit on at least one specified link associated with said switch; and
if sufficient bandwidth for the circuit is not available on said at least one specified link, substituting a parallel link for said at least one specified link in the path of the circuit,
wherein the setup message indicates whether substitution of parallel links for specified links is permitted and said substituting step comprises:
determining whether substitution for said at least one specified link is permitted based on the setup message; and
if substitution for said at least one specified link is permitted, determining whether sufficient bandwidth is available for the circuit on a parallel link to said at least one specified link; and
if sufficient bandwidth is available for the circuit on a parallel link, allocating bandwidth on the parallel link for the circuit.

2. The method of claim 1, wherein said receiving step comprises:
receiving said setup message at the switch via a network signaling protocol.

3. The method of claim 1, wherein said substituting step further comprises:
allocating bandwidth on the parallel link for the circuit; and
updating the setup message to replace said at least one specified link with the parallel link in the sequence of links.

4. The method of claim 3, further comprising:
transmitting the updated setup message to a next switch in the path specified in the updated setup message.

5. The method of claim 3, further comprising:
updating a record stored at the switch of the amount of bandwidth available on the parallel link; and
advertising the updated record of the amount of bandwidth available on the parallel link to other switches using a network routing protocol.

6. The method of claim 1, wherein the setup message comprises a sequence of flags, each flag associated with a link in the sequence of links and indicating whether substitution is permitted for the associated link.

7. The method of claim 1, wherein the setup message comprises a flag indicating whether substitution is permitted for all of the links in the path of the circuit.

8. The method of claim 1, wherein a wildcard character is used to specify a link in the sequence of links when substitution is permitted for that link.

9. A method of initiating the setup of a circuit, comprising:
calculating a circuit path through a network from a source switch to a destination switch;

generating a setup message specifying links in the circuit path and indicating whether substitution of parallel links is permitted for the links in the circuit path; and transmitting the setup message along the circuit path using a network signalling protocol, wherein said generating step comprises:

indicating that substitution of parallel links is not permitted for any of the links in the circuit path when provisioning of a new circuit; and indicating that substitution of parallel links is permitted for all of the links in the circuit path when restoring a failed circuit.

10. The method of claim 9, wherein said generating step further comprises:

generating a setup message sequentially listing the links in the circuit path and including a plurality of flags, each flag associated with one of the links in the circuit path; and setting the flags to one of a first value indicating that substitution of a parallel link for the associated link is not permitted and a second value indicating that substitution of a parallel link for the associated link is permitted.

11. The method of claim 9, wherein said generating step further comprises:

generating a setup message having a flag set to one of a first value indicating that substitution of parallel links is not permitted for any of the links in the circuit path and a second value indicating the substitution of parallel links is permitted for any of the links in the circuit path.

12. The method of claim 9, wherein said generating step further comprises:

specifying at least one link in the circuit path using a wildcard character to indicate that substitution of a parallel link is permitted for the at least one link.

13. A method of provisioning a circuit, comprising:

generating a setup message specifying links in a path of the circuit and indicating whether substitution is permitted for the links;

sequentially transmitting the setup message to each switch in the path of the circuit; and at each switch, in response to the setup message:

determining whether sufficient bandwidth is available for the circuit on the specified links associated with the switch, if sufficient bandwidth is not available for the circuit on a specified link, determining whether substitution is allowed for that specified link based on the setup message, and if substitution is allowed for the specified link, substituting a parallel link having sufficient bandwidth for the circuit for the specified link in the path of the circuit, wherein said generating step comprises:

indicating that substitution is not permitted for any of the links in the path of the circuit when provisioning a service path for a new circuit; and indicating that substitution is permitted for all of the links in the path of the circuit when provisioning a restoration path for a failed circuit.

14. A system comprising:

means for receiving a setup message specifying a path of a circuit as a sequence of links;

means for determining whether sufficient bandwidth is available for the circuit on at least one specified link associated with a switch; and means for substituting a parallel link for said at least specified one link in the path of the circuit, wherein the setup message indicates whether substitution of parallel links for specified links is permitted and said means for substituting comprises:

means for determining whether substitution for said at least one specified link is permitted based on the setup message; and means for determining whether sufficient bandwidth is available for the circuit on a parallel link to said at least one specified link; and means for allocating bandwidth on the parallel link for the circuit.

15. The system of claim 14, wherein said means for substituting further comprises:

means for allocating bandwidth on the parallel link for the circuit; and means for updating the setup message to replace said at least one specified link with the parallel link in the sequence of links.

16. The system of claim 15, further comprising:

means for transmitting the updated setup message to a next switch in the path specified in the updated setup message.

17. A system comprising:

means for calculating a circuit path through a network from a source switch to a destination switch;

means for generating a setup message which specifies links in the circuit path and indicates whether substitution of parallel links is permitted for the links in the circuit path; and means for transmitting the setup message along the circuit path using a network signaling protocol, wherein said setup message comprises:

a flag set to one of a first value indicating that substitution of parallel links is not permitted for any of the links in the circuit path and a second value indicating the substitution of parallel links is permitted for any of the links in the circuit path.

18. A system comprising:

means for calculating a circuit path through a network from a source switch to a destination switch;

means for generating a setup message which specifies links in the circuit path and indicates whether substitution of parallel links is permitted for the links in the circuit path; and means for transmitting the setup message along the circuit path using a network signalling protocol, wherein said means for generating comprises:

means for indicating that substitution of parallel links is not permitted for any of the links in the circuit path when provisioning of a new circuit and that substitution of parallel links is permitted for all of the links in the circuit path when restoring a failed circuit.

19. The method of claim 18, wherein said setup message comprises:

a plurality of flags, each flag associated with one of the links in the circuit path to indicate whether substitution of a parallel link is permitted for the associated link.

* * * * *